United States Patent [19]

Schenk

[11] Patent Number: 5,444,626
[45] Date of Patent: Aug. 22, 1995

[54] CONTROL SYSTEM FOR CALCULATING PARAMETER CONTROL VALUES IN REPETITIVE CONTROL PROCESSES

[75] Inventor: Joachim Schenk, Hemmingen, Germany

[73] Assignee: Robert Bosch GmbH, Stuttgart, Germany

[21] Appl. No.: 55,206

[22] Filed: Apr. 30, 1993

[30] Foreign Application Priority Data

Jun. 16, 1992 [DE] Germany .................... 42 19 669.8

[51] Int. Cl.⁶ .................... B60K 41/00; G08C 15/00
[52] U.S. Cl. .................... 364/431.04; 364/431.01; 364/431.1; 364/431.11; 364/431.12; 364/DIG. 1; 364/DIG. 2; 364/222; 364/244; 123/417; 123/480; 123/145 A; 123/179.21
[58] Field of Search .................... 364/431.01–431.12, 364/425, 424.1, 551, 442, 426.02, 426.01, 426.03, 571, 483, 580, 579, 222, 244; 123/480, 417, 359, 352, 339, 417, 480; 73/117.3, 118.1, 116, 117.2, 112; 395/500, 600, 800, 725; 340/870.13, 439, 441; 370/85.15, 85.3, 85.6, 95.2

[56] References Cited

U.S. PATENT DOCUMENTS

| | | | |
|---|---|---|---|
| 3,851,160 | 11/1974 | Heimprecht | 364/425 |
| 4,128,005 | 12/1978 | Arnstron et al. | 364/431.01 |
| 4,204,256 | 5/1980 | Klötzner | 364/431.12 |
| 4,207,610 | 6/1980 | Gordon | 364/425 |
| 4,234,921 | 11/1980 | Kinoshita et al. | 364/431.01 |
| 4,736,626 | 4/1988 | Mizuno et al. | 364/431.07 |
| 4,751,633 | 6/1988 | Henn et al. | 364/431.12 |
| 4,791,900 | 12/1988 | Buck et al. | 123/359 |
| 4,843,557 | 6/1989 | Ina et al. | 364/431.11 |
| 4,852,009 | 7/1989 | Jonner et al. | 364/426.02 |
| 4,862,370 | 8/1989 | Arnold et al. | 364/431.10 |
| 4,873,638 | 10/1989 | Shiraishi et al. | 364/426.01 |
| 4,908,792 | 3/1990 | Przbyla et al. | 364/431.04 |
| 4,924,399 | 5/1990 | Kaiser et al. | 364/431.03 |
| 5,001,642 | 3/1991 | Botzenhardt et al. | 364/431.12 |
| 5,116,108 | 5/1992 | Sigl et al. | 303/103 |
| 5,343,470 | 8/1994 | Hideshima et al. | 370/85.1 |

OTHER PUBLICATIONS

Serial Communications Controller Architectural Overview Intel Corporation, 82526 Jan. 1989.
Elektronik Im Kraftfahrzeugbau (Deutsch) Oct. 1986.
W. Botzenhardt, M. Litschel & J. Uhruh, "Bussysteme fuer Kfz-Steuergeraete," [Bus Systems for Vehicle Control Devices], in *Elektronik im Kraftfahrzeugbau*, VDI Berichte 612, pp. 459–470, published Jan. 1986 by Soc. of German Engineers, Dusseldorf, Germany.
Intel Corp., "82526 Serial Communications Controller Architectural Overview," order #270678-01, Jan. 1989, pp. 1-35.
Von Achim Raab, "CAN-Das Controller Area Network," published in Jun. 1992 issue of *Elektor*, pp. 20–22.

Primary Examiner—Kevin J. Teska
Assistant Examiner—Jacques H. Louis-Jacques
Attorney, Agent, or Firm—Frishauf, Holtz, Goodman & Woodward

[57] ABSTRACT

It is known for a central electronic control unit in a motor vehicle to exchange data through a serial data bus with other control units, e.g. those for fuel injection, ignition timing, and braking. Prior art systems transmitted these data automatically, regardless of whether all these parameters were relevant to the actual operating state of the vehicle, thereby resulting in heavy loading of the serial bus. The present invention determines which parameters are irrelevant to the current operating state and suppresses transmission, or even calculation, of these irrelevant parameters.

10 Claims, 5 Drawing Sheets

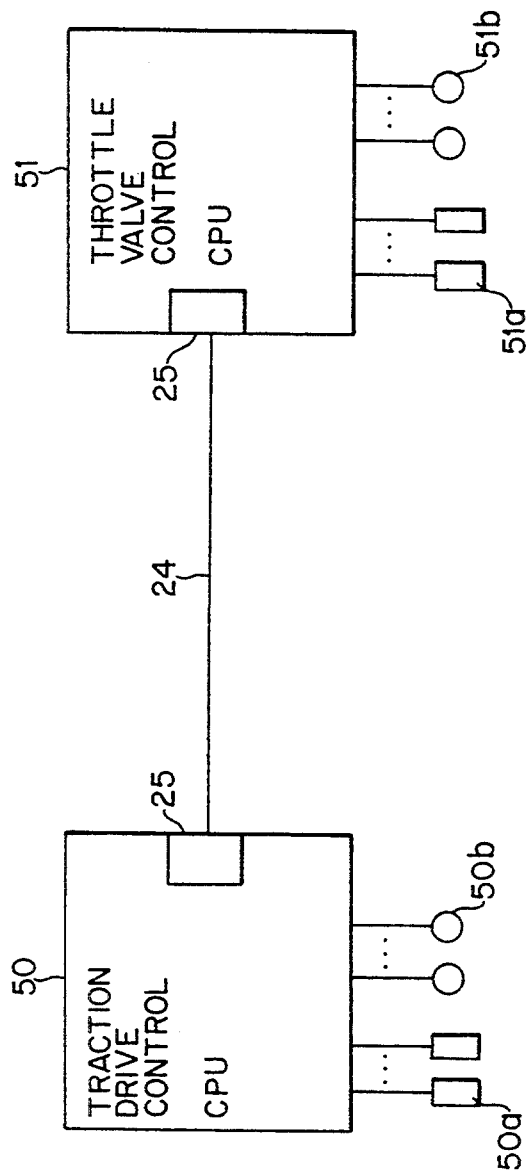
FIG. 4
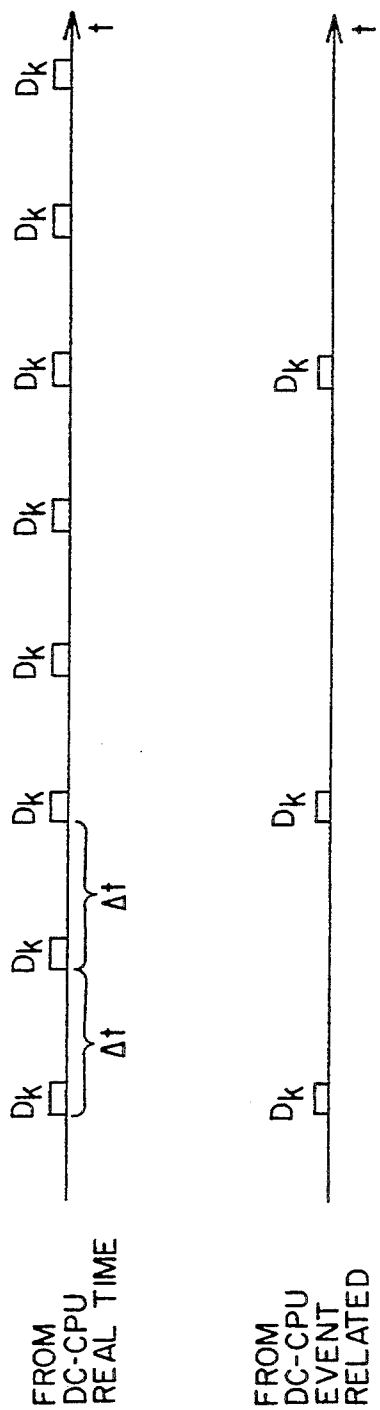
FIG. 5A  FROM DC-CPU REAL TIME
FIG. 5B  FROM DC-CPU EVENT RELATED

5,444,626

CONTROL SYSTEM FOR CALCULATING PARAMETER CONTROL VALUES IN REPETITIVE CONTROL PROCESSES

Cross-reference to related patents, the disclosures of which are hereby incorporated by reference: U.S. Pat. No. 5,116,108—SIGL et al./BOSCH—May 26, 1992; U.S. Pat. No. 5,001,642—BOTZENHARDT et al.-/BOSCH—Mar. 19, 1991; U.S. Pat. No. 4,908,792—PRZYBYLA et al./BOSCH; U.S. Pat. No. 4,862,370—ARNOLD et al./BOSCH; U.S. Pat. No. 4,852,009—JONNER et al./BOSCH.

FIELD OF THE INVENTION

The invention relates generally to a control system for a motor vehicle and, more particularly, to such a control system in which overloading of the serial data bus is avoided by not transmitting, on the bus, operating parameter values which are inappropriate to the current operating mode of the vehicle. For example, in downhill braking mode, one should refrain from transmitting fuel injection data, because the engine doesn't fire.

BACKGROUND

A control apparatus for calculating the parameter control values for repetitive control operations is already known from the report "Bussysteme füKFZ-Steuergeräte" (Bus Systems for Automotive Control Devices) by W. Botzenhardt, M. Litschel and J. Unruh; VDI-Berichte 612 Elektronik im Kraftfahrzeugbau, 1986 (Reports 612 of the Society of German Engineers: Electronics in Automotive Vehicle Construction, 1986), in which the parameter control values are, however, transmitted at regular intervals via the external data bus, regardless of the operating state or condition.

THE INVENTION

In accordance with the invention, there is provided a control apparatus of the aforementioned kind with means determining whether at least one predetermined condition is satisfied and, if so, for omitting or suppressing the transfer of at least one of the parameter control values to the data bus. By making a determination in respect of a condition of one operational parameter for a control operation, such an apparatus advantageously makes a decision about which parameter control values, if any, need be transmitted. In this manner, superfluous or unnecessary data transmissions may be avoided, and the load on the bus may be reduced. Thus, a reduction in the system latency time can be achieved in the connected bus system.

In accordance with the invention, the control apparatus is provided with means for suppressing the calculation of the control variable if the condition of the at least one operational parameter is satisfied. If the condition is true in respect of the at least one operational parameter the control apparatus advantageously performs a calculation in respect of at least one other control variable and/or further data. Moreover, in case the condition in respect of the one operational parameter is found to be true, the control apparatus transfers the at least one other control variable and/or further data to the data bus. Advantageously, the control apparatus is provided with means for evaluating signals from connected sensors or transducers for determining operational parameters. The apparatus is also provided with means for receiving further operational parameters by way of the serial data bus. The condition of the operational parameter in respect of which the control apparatus makes a determination may be whether a brake contact switch has been actuated. Another operational parameter, of whose condition the control apparatus makes a determination, may be whether an idling switch has been actuated and whether the engine speed (engine rotations) exceeds a predetermined value. Other parameters calculated by the control apparatus may be the ignition angle, the instant of ignition, the period of fuel injection, the instant of fuel injection and values for setting at least one actuator of the brake system of an automotive vehicle. One test the control system can make is whether the current value of a parameter exceeds the previous value of that same parameter by more than a predetermined amount; an absolute value/subtraction function can be used to make such a test.

It is of particular advantage to make a determination of an operational parameter before performing a calculation, and not to make a calculation of those parameter control values which need not be transmitted. In this manner, the load imposed upon the control apparatus by calculations is reduced. It is also advantageous to make a calculation in respect of another parameter and/or other data, and to transmit the result over the bus, instead of the parameter control value which needs no calculation or transmission. In this manner, greater precision or exactness is attainable in respect of certain control processes. Furthermore, safety functions having high data content can be carried out. A particularly advantageous determination establishes whether the value of a calculated control variable has not changed by more than a predetermined value from a previously calculated value. Thus, many parameter control values do not need to be transmitted.

DRAWINGS

Embodiments of the invention are depicted in the drawings and are explained in detail in the following description.

FIG. 4 depicts a frictional drive control unit and a throttle valve control unit interconnected by an external data bus;

FIG. 5a depicts time-synchronous data transmissions of a control value from the traction control apparatus;

FIG. 5b depicts the result-synchronous data transmission of a control value from the traction control apparatus.

DETAILED DESCRIPTION OF THE PREFERRED EMBODIMENTS

Figure 1:
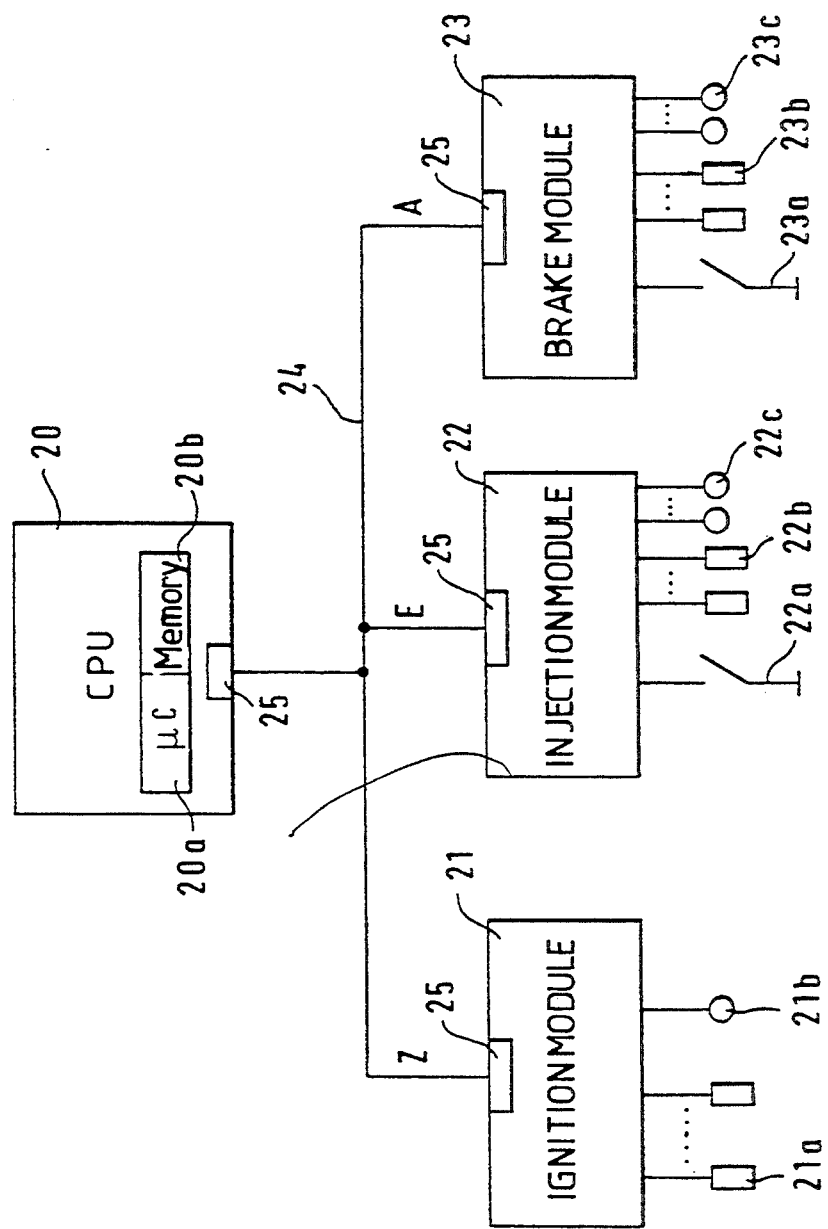
FIG. 1 is a schematic rendition of a control apparatus for calculating parameter control values, and showing the ignition, fuel injection and brake modules connected thereto by an external data bus.

In FIG. 1, reference numeral 20 designates a central processing unit, reference numeral 21 designates an ignition module, reference numeral 22 identifies a fuel injection module, and reference numeral 23 refers to a brake module. The mentioned components are connected to an external data bus 24. For connection to the external data bus 24 each components is provided with an interface 25. The network thus structured is intended for use in an automotive vehicle of the kind provided with an internal combustion engine.

In addition to the interface 25, the central processing unit 20 is provided with a high-performance microprocessor 20a and a memory component 20b. The microprocessor 20 is configured such that it may detect with reasonable speed the parameters of repetitive control processes, such as of the ignition, fuel injection and braking processes. The calculated parameter control values are then transmitted to the individual modules by way of the external data bus 24. Repeating parameter control values in respect of the ignition process are, for example, the ignition angle and the ignition timing.

These two variables have to be recalculated within an extremely short time period in order to assure maximum performance of the combustion engine. In a six-cylinder engine running at 6,000 rpm, the interval between two ignitions is only 3.3 milliseconds, so that the calculation, the transmission as well as the adjustment of the calculated values must all be carried out within this interval. Repetitive parameter control values of the fuel injection process are the period or duration of the injection and the instant of injection, for example. They, too, given particular operating conditions, need to be determined within a very brief period of time.

The central processing unit also performs calculations relating to repetitive processes in the braking module, such as the parameters of connected actuators 23c of the hydraulic control circuits of the brake system, for instance. In some circumstances the calculations of these variables require solving complicated differential equations. Such systems are disclosed in, for example, U.S. Pat. No. 5,116,108, SIGL et al.

In addition to their interfaces 25 shown in FIG. 1, each of the depicted modules 21, 22, 23, is also provided with a microprocessor, as well as a memory component and input and output circuits. Transducers 21a for reading the engine speed, the engine temperature and crankshaft or camshaft reference marks of the combustion engine are connected to the ignition module 21a, for instance. The actuator 21b has been shown, for example, as the final or input stage of an ignition coil. Transducers 22b reading the intake air quantity, the throttle valve position, the intake air temperature, and the full-load contact are connected to the fuel injection module 22. The idle contact transducer 22a has been shown separately. The actuators 22c shown here are final stages connected to the fuel pump and the injection valve. In respect of the braking module 23, there are provided transducers 23b reading the rotations of each wheel, for instance, and the actuators 23c are the final stages connected to magnetic valves of the hydraulic brake control circuits. A sensor 23a for the braking contact has been depicted separately.

For calculating the respective parameter control values, the transducer signals from the individual control modules 21, 22, 23 must be fed to the central processing unit 20. For that reason, the modules are continually transmitting these values to the central processing unit 20 by way of the external data bus 24. The calculation of the parameter control values, the detection of the transducer signals by the modules, as well as the setting of the calculated parameter control values, have been described sufficiently in prior art literature, such as BOSCH Technical Reports and MOTRONIC manuals, so that only those aspects of these processes will hereafter be explained which are essential to the invention. The transmissions of data by the interfaces and by the external data bus 24 have also been described in the prior art. In this connection, any data transmission system suitable for automotive vehicles, such as, for example, the CAN (Controller Area Network) bus system, may be utilized in the practice of the present invention. See U.S. Pat. No. 5,001,642—BOTZENHARDT.

Figure 2:
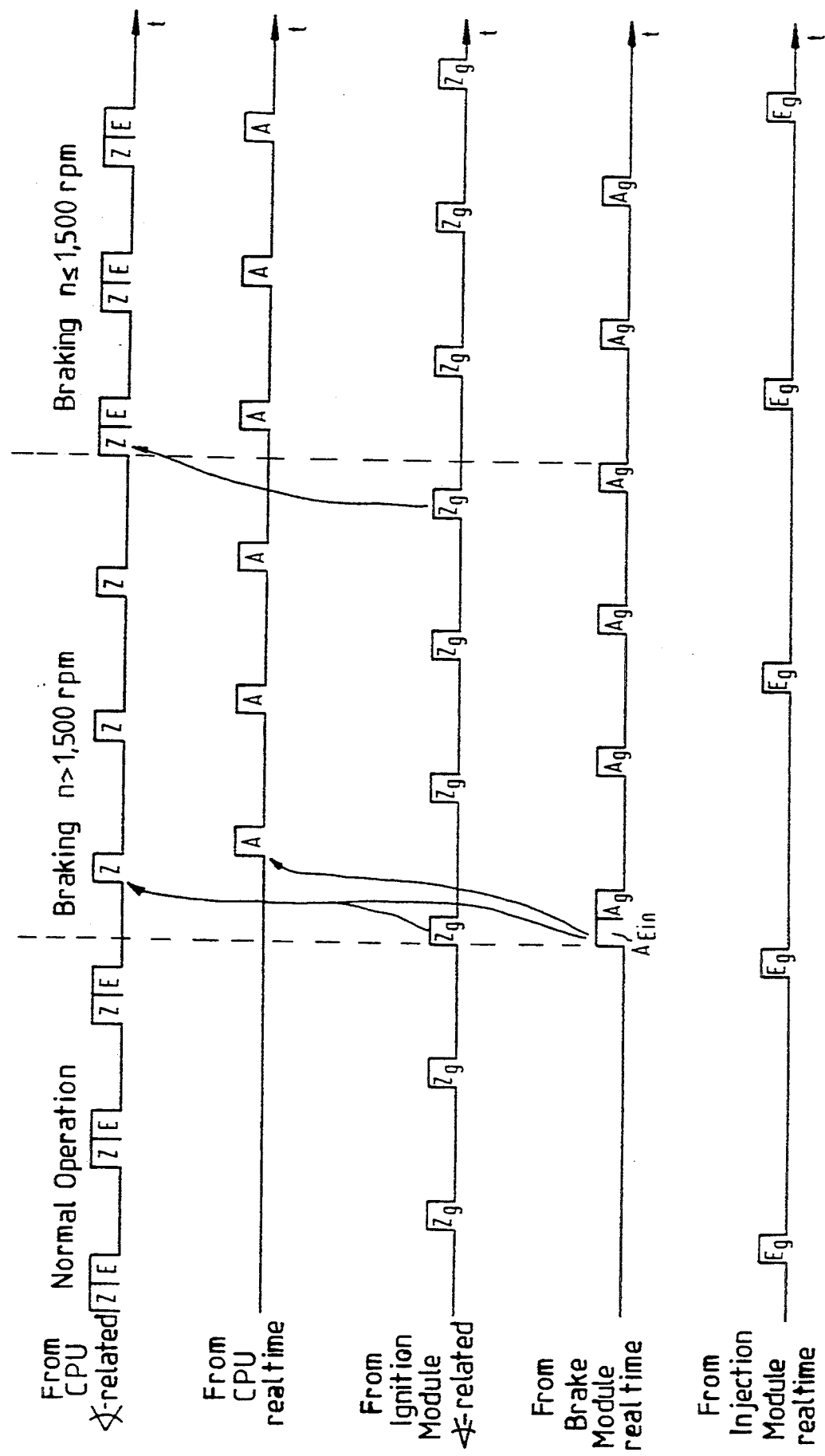
FIG. 2 depicts the transmission patterns in the external data bus of data relating to three different operational states.

FIG. 2 depicts the flow of data in the external data bus 24 from the central processing unit 20 to the ignition, fuel injection and braking modules 21, 22, 23 under three operational modes or conditions, viz.: "normal operation, braking at engine speeds in excess of 1,500 rpm, and braking at engine speeds below 1,500 rpm." During normal operation of the automotive vehicle, transducer signals $E_g$ are transmitted by the fuel injection module 22 to the central processing unit 20 in a particular timed pattern.

During normal operation, no data is transmitted to the central processing unit 20 from the braking module 23. The ignition module, for its part, is transmitting detected transducer signals $Z_g$ to the central processing unit 20. In this process, the individual instances of transmission are selected in synchronism with the rotation of the crankshaft of the combustion engine of the automotive vehicle. The instances of transmission are thus related to the crankshaft angle and need not necessarily be uniformly spaced with regard to previous instances of transmission. From the transducer signals received by it, the central processing unit 20 derives parameter control values Z, E relating to the ignition and fuel injection processes, respectively.

During normal operation, these parameter control values are also transmitted in a crankshaft angle-related manner to the ignition and fuel injection modules 21, 22. When the driving state of the vehicle changes from normal operation to a braking operation, the braking module 23 transmits the detected transducer signals $A_g$ to the central processing unit 20 time-synchronously, hereinafter referred to as "real time". Together with the initial transmission, a message $A_{Ein}$ or $A_{on}$ is also transmitted to the central processing unit 20, alerting the central processing unit 20 of the closure of the braking contact, which has now occurred, and of the initiation of a braking operation. In case the engine speed is in excess of 1,500 rpm, the central processing unit 20 will from then on transmit over the external data bus 24 to the ignition module 21 only the control variable Z in an angle-related manner.

In addition, however, calculated parameter control values A for the braking module 23 are transmitted to the braking module 23 at short time intervals. These calculated parameter control values may correspond, for instance, to the control values of the magnetic valves in the hydraulic control circuits of the braking system. The brake pressure is controlled by those valves. The ignition module 21 and the fuel injection module 22 continue transmitting detected transducer signals $Z_g$ and $E_g$ to the central processing unit 20, just as during normal operation. If the central processing unit 20 detects that during the braking operation the engine speed falls below 1,500 rpm, parameter control values E for fuel injection operations will additionally be transmitted in a manner related to the crankshaft angle to the fuel injection module 22, again. In other respects, the flow of data in the external data bus 24 is the same as during a braking operation with an engine speed in excess of 1,500 rpm, yet at an increased load on the bus or a reduced cycling of the parameter control value A.

Figure 3:
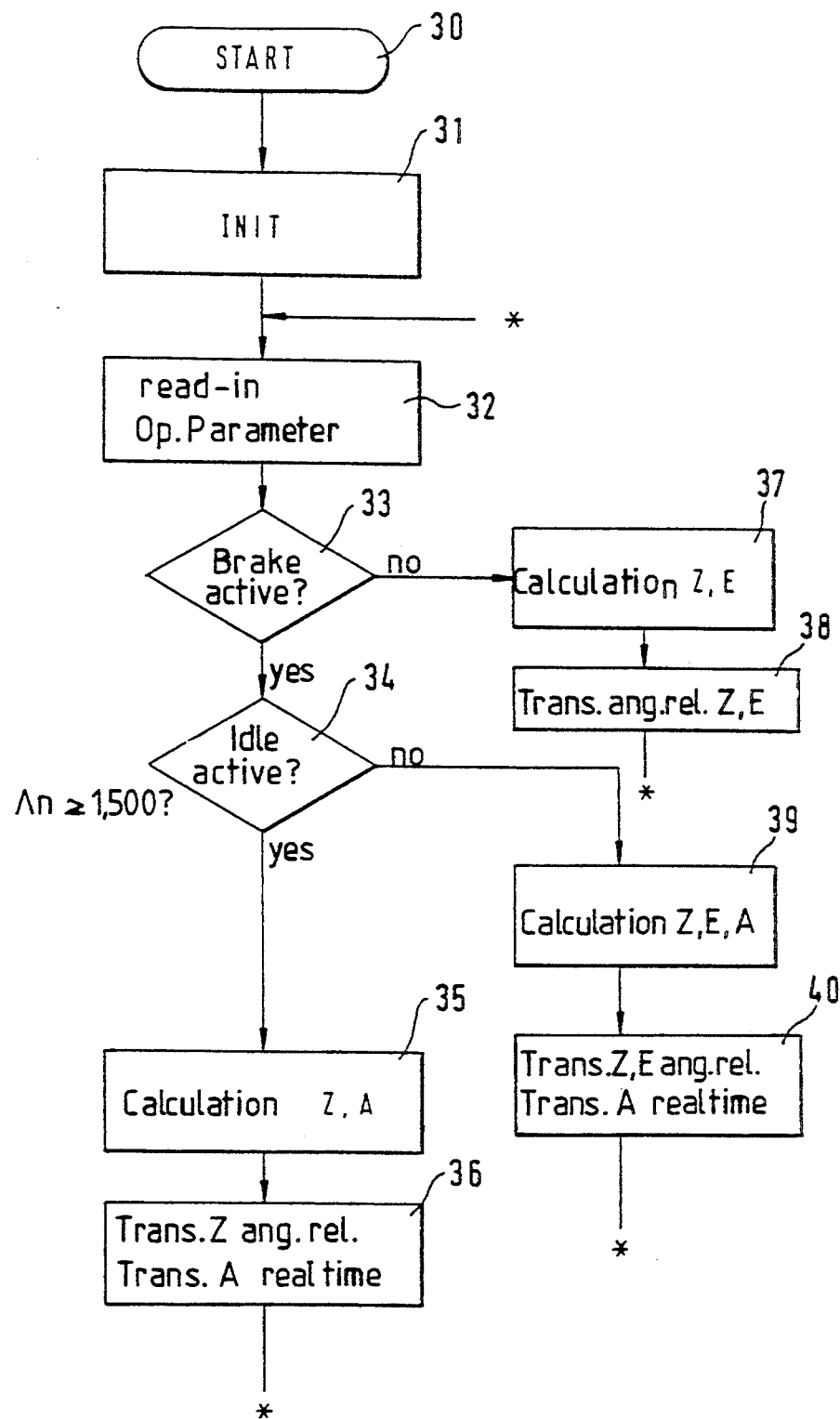
FIG. 3 is a flowchart of a program to be executed by a microprocessor of the control apparatus of FIG. 1.

The purpose of FIG. 3 is to explain the flow of the control steps performed by the central processing unit 20. Following the start 30 of the program, by turning an ignition key to its "on" position (not shown), the central processing unit 20 is initialized in program stage 31. This involves executing test sequences, and setting of the central processing unit's 20 registers at predetermined initial values. The central processing unit 20 reads the operational parameters into the program unit. These operational parameters correspond to transducer signals received from the individual modules 21, 22, 23. Thereafter, the program is fed to a test or decision stage 33. The operational parameter condition determined by the decision stage 33 is whether the brake has been activated. If it has not, the program in stage 37 will be carried out. This prompts calculation of the ignition and fuel injection parameter control values Z, E as provided for the normal operation depicted in FIG. 2. The calculated parameter control values Z, E are thereafter transmitted by a programming stage 38 angle-synchronously to the modules 21, 22, respectively.

Following this, the program is cyclically continued or repeated by the programming stage 32. If the decision stage 33 determines that the brake has been activated, the program continues to test or decision stage 34. The operational parameter to be determined there is whether the idle switch is closed and whether the speed of the engine is in excess of 1,500 rpm. If both conditions are true, the program stage 35 will calculate the parameter control values Z and A for ignition and brake operations, respectively. No calculation will be performed regarding fuel injection control value E.

In program step 36, parameter control value Z is sent angle-synchronously, and parameter control value A is sent time-synchronously, to respective modules 21, 23. Following this, the program will again continue to a programming stage 32.

If the operating condition determined by the decision stage 34 are false or negative, parameter control values Z, E, A of the ignition, fuel injection and braking operations, respectively, will be calculated in program stage 39 and transmitted to program stage 40. Again, parameter control values Z, E are transmitted in relation to the crankshaft angle, and control value A is transmitted in a real time mode. Thereafter, the program again continues to program stage 32.

FIG. 4 schematically depicts a second embodiment of the invention. In FIG. 4, reference numeral 50 designates a traction control unit of an automotive vehicle provided with an internal combustion engine, the traction control unit being connected to a throttle valve control unit 51 of the vehicle by an external data bus 24. The controls are each provided with an interface 25 to which the external data bus 24 is connected. The throttle valve control unit, as well as the traction control unit are provided with at least one microprocessor, a memory as well as input and output circuits connected to transducers 50a, 51a and to the actuators 50b, 51b. For the sake of clarity, these components have not been shown in the drawing.

On the basis of the transducer signals, the throttle valve control unit 51 determines the value of the throttle valve position angle in a given time frame. This value corresponds to a certain "driver's wish" input to the throttle valve control unit 51 expressed by depressing an accelerator pedal. For this purpose, a sensor or transducer is connected to the throttle valve control unit 51 which detects the position of the accelerator pedal. However, the "driver's wish" may require an adjustment by the traction control unit 50, as it is deemed not to be sensible, in terms of a safe driving operation, to open the throttle valve of the internal combustion engine further when the traction control unit 50, with the aid of transducers connected to it, is detecting that the wheels are already spinning.

Hence, the value of the throttle valve setting is transmitted to the traction control unit 50 before it is actually set by the throttle valve control unit 51. The traction control unit 50 then calculates an adjustment value $D_k$ and transmits the adjustment value $D_k$ to the throttle valve control unit 51 prompting an adjustment by the value $D_k$ in the position of the throttle valve and then to set its adjusted throttle valve position value.

FIG. 5a depicts several data transmissions of adjustment values $D_k$ from the traction control unit 50 to the throttle valve control unit 51. As shown, the transmissions are taking place in a set time pattern in spaced intervals dt. The consecutive transmission pulses are spaced equidistantly.

FIG. 5b shows several data transmissions of adjustment values $D_k$ by a traction control unit 50 in accordance with the invention. In this instance, transmissions are not taking place in a set time pattern, but adjustment values $D_k$ are instead transmitted to the throttle valve control unit 51 if the adjustment value $D_k$ differs from a previously transmitted adjustment value $D_k$ by more than a threshold value $\pm dD_k$.

Figure 6:
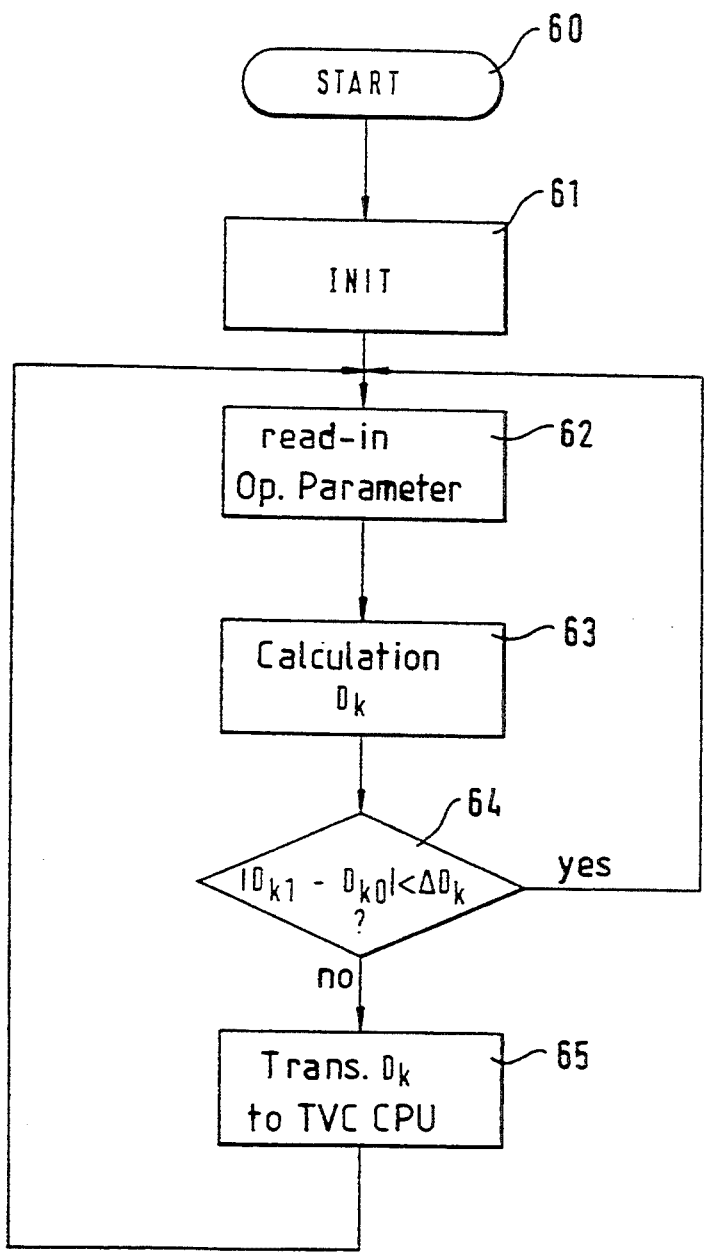
FIG. 6 is a flowchart of a program to be executed by a microprocessor of the traction control apparatus.

The operational mode of the traction control unit 50 as regards the transmission of the adjustment value $D_k$, is depicted in FIG. 6. Following the program start 60, execution of the program in stage 61 is taking place. This prompts initialization and testing of the traction control unit 50. Thereafter, the operational parameters of the control processes of the traction control unit 50 are being established. For that purpose, the transducer signals of the connected transducers 50a, for instance, are detected. Simultaneously therewith, several operational parameters are also received from the throttle valve control unit 51 by way of the connected external data bus 24. Among others, the throttle valve set value is received from the throttle valve control unit 51 in this program stage. Thereafter, the calculation of the adjustment values $D_k$ takes place in program stage 63, taking into consideration the previously determined operational parameters. Following this, a determination is made in the decision stage 64 about the state of the operational parameter as to whether the newly detected adjustment value $D_k$ has changed relative to the previously detected adjustment value as hyteresis by more than a threshold value $\pm dD_k$. If the answer is affirmative, the newly established adjustment value $D_k$ is transmitted by the program stage 64 to the throttle valve control unit 51. Thereafter, the program continued to a program stage 62. If no change is detected by the decision stage 64, no adjustment value $D_k$ will be transmitted to throttle valve control unit 51, and the program will continue to the program stage 62.

The first embodiment may be modified in a simple manner when turning off thrust or driving power is to be accomplished during extended downhill driving. For that purpose, the program of the central processing unit 20 requires modification in such a manner that the positive output of the decision stage 34 will prompt suppression of the calculation as well as the transmission of fuel injection data E from the central processing unit 20, even though no braking is taking place.

The two embodiments described are by no means the only possibilities of practicing the invention. The invention may be practiced in connection with any control unit which detects, and transmits, via an external data bus to further receivers connected to the bus, parameter control values of repetitive control processes. These need not necessarily be control units of automotive vehicles. Such control apparatus may, for instance, also be used in the automation of factories and in process controls in general, in which case the control units may be connected to field bus systems. The invention may also be useful in connection with control apparatus which function as network supervision units within a network.

These control apparatus may then perform command decisions on the basis of decisions made in respect of operational parameters which parameters are then transmitted to connected control units.

What is claimed is:

1. In a control system for calculating control parameter values for repetitive controlled processes in a motor vehicle, including at least one of ignition, fuel injection, and braking processes,
   said control system having
   at least one microprocessor,
   a plurality of peripheral modules,
   a plurality of sensors measuring respective operating parameters of said controlled processes for input to said plurality of peripheral modules,
   a serial data bus, interconnecting said at least one microprocessor and said plurality of peripheral modules, and carrying operating parameter values from said modules to said microprocessor, and parameter control values ($Z$, $E$, $A$, $D_k$) from said microprocessor to said modules, said parameter control values normally being cyclically occurring at periodic intervals,
   a method of operating said control system, wherein said at least one microprocessor (a) tests whether at least one predetermined operating parameter condition is satisfied by determining whether a current calculated control value ($D_{k1}$) of said predetermined operating parameter exceeds a previous calculated value ($D_{k0}$) of that parameter by more than a predetermined amount ($dD_k$), and (b) inhibits transmission, on said serial data bus, of at least one of said cyclically occurring parameter control values when $D_{k1}$ does not exceed $D_{k0}$ by $dD_k$, thereby reducing loading of said serial data bus.

2. A method according to claim 1, wherein,
   when said condition is satisfied, said at least one microprocessor not only inhibits transmission of said at least one cyclically occurring parameter control value ($Z$, $E$, $A$), but also inhibits calculation of said inhibited cyclically occurring parameter control value.

3. A method according to claim 2, wherein,
   when said condition is satisfied, said at least one microprocessor inhibits calculation of at least two of said cyclically occurring parameter control values.

4. A method according to claim 2, wherein,
   when said condition is satisfied, said at least one microprocessor performs alternative data processing steps instead of said inhibited calculation of said parameter control value.

5. A method according to claim 4, wherein said microprocessor transmits a result of said alternate data processing steps via said serial data bus.

6. A method according to claim 1, wherein
   said at least one microprocessor evaluates operating parameter values measured by said plurality of sensors and transmitted via said serial data bus.

7. A method according to claim 1, wherein
   said microprocessor tests, as a predetermined operating parameter condition, whether a brake contact switch has been actuated.

8. A method according to claim 1, wherein
   said microprocessor tests, as a predetermined operating parameter condition, whether simultaneously engine RPM has exceeded a predetermined value and an idle contact switch has been actuated.

9. A method according to claim 1, wherein the parameter control values calculated by said microprocessor include dwell angle, ignition instant, fuel injection duration, fuel injection instant, and a brake system actuator setting value.

10. A method according to claim 1, wherein
    said parameter is a corrected throttle setting, generated by a traction control means.

* * * * *